US010346612B1

(12) United States Patent
Donovan et al.

(10) Patent No.: US 10,346,612 B1
(45) Date of Patent: Jul. 9, 2019

(54) COMPUTER NETWORK DEFENSE TRAINING ON OPERATIONAL NETWORKS USING SOFTWARE AGENTS

(71) Applicant: Architecture Technology Corporation, Minneapolis, MN (US)

(72) Inventors: Matthew P. Donovan, Trumansburg, NY (US); Robert A. Joyce, Ithaca, NY (US); Judson Powers, Ithaca, NY (US); Dahyun Hollister, Ithaca, NY (US)

(73) Assignee: Architecture Technology Corporation, Minneapolis, MN (US)

( * ) Notice: Subject to any disclaimer, the term of this patent is extended or adjusted under 35 U.S.C. 154(b) by 190 days.

(21) Appl. No.: 15/627,293

(22) Filed: Jun. 19, 2017

(51) Int. Cl.
*G06F 21/55* (2013.01)
*G06F 21/56* (2013.01)

(52) U.S. Cl.
CPC ......... *G06F 21/566* (2013.01); *G06F 21/554* (2013.01); *G06F 2221/033* (2013.01)

(58) Field of Classification Search
CPC .............................. G06F 21/566; G06F 21/554
See application file for complete search history.

(56) References Cited

U.S. PATENT DOCUMENTS

| | | | |
|---|---|---|---|
| 7,496,959 B2 | 2/2009 | Adelstein et al. | |
| 7,886,049 B2 | 2/2011 | Adelstein et al. | |
| 8,176,557 B2 | 5/2012 | Adelstein et al. | |
| 8,474,047 B2 | 6/2013 | Adelstein et al. | |
| 9,076,342 B2 | 7/2015 | Brueckner et al. | |
| 9,384,677 B2 | 7/2016 | Brueckner et al. | |
| 2009/0208910 A1* | 8/2009 | Brueckner ............... | G09B 5/00 434/11 |
| 2012/0209983 A1 | 8/2012 | Bronner et al. | |
| 2012/0210427 A1 | 8/2012 | Bronner et al. | |
| 2017/0032694 A1 | 2/2017 | Brueckner et al. | |
| 2017/0032695 A1 | 2/2017 | Brueckner et al. | |

OTHER PUBLICATIONS

Kick, "Cyber Exercise Playbook", MITRE, Nov. 2014, 50 pgs.
Carter, "The DOD Cyber Strategy," The Department of Defense, Apr. 2015, 42 pp.
Damodaran et al., "Cyber Modeling & Simulation for Cyber-Range Events," SummerSim 2015, Proceedings of the Conference on Summer Computer Simulation, Jul. 26-29, 2015, 8 pp.
(Continued)

*Primary Examiner* — Oleg Korsak
(74) *Attorney, Agent, or Firm* — Shumaker & Sieffert, P.A.

(57) ABSTRACT

An example method includes storing a scenario event list that defines one or more events associated with a training exercise, and configuring, based on the events defined in the scenario event list, one or more software agents to emulate one or more cyber-attacks against a host computing system during the training exercise, which includes configuring the software agents to save a state of one or more resources of the host computing system prior to emulating the cyber-attacks and to restore the state of the resources upon conclusion of the cyber-attacks. The example method further includes deploying the software agents for execution on the host computing system during the training exercise to emulate the cyber-attacks against the host computing system using one or more operational networks.

24 Claims, 5 Drawing Sheets

(56) References Cited

OTHER PUBLICATIONS

Card et al., "Navy Cyber Power 2020," Office of the Deputy Chief of Naval Operations for Information Dominance, Nov. 2012, 16 pp.
Singh et al., "A Detailed Survey and Classification of Commonly Recurring Cyber Attacks," International Journal of Computer Applications (0975-8887), vol. 141, No. 10, May 2016, 5 pp.
Poulin, "Cyber Warfare: Just How Vulnerable is the U.S. Military," Real Clear Defense, realcleardefense.com/articles/2016/06/07/cyber_warfare_just_how_vulnerable_is_the_us_military_109423.html, Jun. 7, 2016, 2 pp.
Serbu, "Air Force Stands Up New Office to Shield Weapons From Cyber Attacks," Federal News Radio, federalnewsradio.com, Jan. 10, 2017, 3 pp.
"U.S. Federal Cybersecurity Market Forecast 2017-2022," Market Research Media, marketresearchmedia.com, May 31, 2017, 7 pp.
"Global IT Training Market 2015-2019 to Grow 6.2%—Key Vendors are CGS. Firebrand, Global Knowledge, IBM & New Horizon—Research," businesswire.com, Mar. 3, 2016, 3 pp.
Wu et al., "Logical Network Boundary Controller," Cybersecurity Applications & Technology Conference for Homeland Security, 2009, Mar. 3-4, 2009, 6 pp.
Bonney et al., "Hardware-in-the-Loop Emulation of Mobile Wireless Communication Environments," 2008 IEEE Aerospace Conference, Mar. 1-8, 2008, Paper No. 1383, 9 pp.

\* cited by examiner

COMPUTER NETWORK DEFENSE TRAINING ON OPERATIONAL NETWORKS USING SOFTWARE AGENTS

STATEMENT REGARDING FEDERALLY SPONSORED RESEARCH OR DEVELOPMENT

This invention was made with government support under Contract No. N68335-17-C-0440 awarded by the US Navy. The government has certain rights in this invention.

BACKGROUND

To combat the growing sophistication and frequency of cyber-attacks, individuals who attempt to thwart or mitigate such attacks must train vigilantly. The primary methods for representing cyber threats in today's training exercises are methods involving either live red teams or "white cards." Live red teams produce realistic results, but they are limited in their availability and the scope of what they can accomplish given real-world and exercise constraints. Command and control of live red teams during exercises, and restoration of operational networks and systems upon completion of these exercises, can also present challenges. Alternatively, white cards may be administered by an exercise control group, and these white cards typically simulate a degraded or denied condition for a period of time. For example, to reduce the potential for catastrophic damage, white cards may be used to simulate events such as system degradation or denial of service. White cards are typically events or attack actions that are printed on paper and handed to training participants, or posted on computer systems, to indicate an attack. If used properly, white cards can generate the desired conditions, but they offer little or no opportunity for the training audience to realistically detect and react to a threat.

Computer network defense training currently takes place either on operational networks or in virtual (e.g., simulated) environments. One major drawback to using virtual environments is that they lack a sufficient amount of realism. Virtualized systems are frequently overly simplified mock-ups of operational systems and lack the fidelity necessary for optimal and effective training. Training on operational networks may provide a full-fidelity environment, but attackers are often placed under significant restrictions to protect the operational network, since they typically cannot disrupt or damage network resources during the course of the exercise.

SUMMARY

In one example, a method includes storing, by an attack computing system, a scenario event list that defines one or more events associated with a training exercise, and configuring, by the attack computing system and based on the one or more events defined in the scenario event list, one or more software agents to emulate one or more cyber-attacks against a host computing system during the training exercise, wherein the attack computing system is communicatively coupled to the host computing system via one or more operational networks. Configuring the one or more software agents includes configuring the one or more software agents to save a state of one or more resources of the host computing system prior to emulating the one or more cyber-attacks against the host computing system, and configuring the one or more software agents to restore the state of the one or more resources of the host computing system upon conclusion of the one or more cyber-attacks. The example method further includes deploying, by the attack computing system, the one or more software agents for execution on the host computing system during the training exercise to emulate the one or more cyber-attacks against the host computing system using the one or more operational networks.

In one example, a computing system includes one or more processors and a non-transitory computer-readable storage medium. The non-transitory computer-readable storage medium stores instructions that, when executed, cause the one or more processors to store a scenario event list that defines one or more events associated with a training exercise, and configure, based on the one or more events defined in the scenario event list, one or more software agents to emulate one or more cyber-attacks against a host computing system during the training exercise, wherein the computing system is communicatively coupled to the host computing system via one or more operational networks, wherein the one or more software agents are configured to save a state of one or more resources of the host computing system prior to emulating the one or more cyber-attacks against the host computing system, and wherein the one or more software agents are further configured to restore the state of the one or more resources of the host computing system upon conclusion of the one or more cyber-attacks. The instructions further cause the one or more processors to deploy the one or more software agents for execution on the host computing system during the training exercise to emulate the one or more cyber-attacks against the host computing system using the one or more operational network.

In one example, a non-transitory computer-readable storage medium stores instructions that, when executed, cause an attack computing system to perform operations that include storing a scenario event list that defines one or more events associated with a training exercise, and configuring, based on the one or more events defined in the scenario event list, one or more software agents to emulate one or more cyber-attacks against a host computing system during the training exercise, wherein the computing system is communicatively coupled to the host computing system via one or more operational networks. Configuring the one or more software agents includes configuring the one or more software agents to save a state of one or more resources of the host computing system prior to emulating the one or more cyber-attacks against the host computing system, and configuring the one or more software agents to restore the state of the one or more resources of the host computing system upon conclusion of the one or more cyber-attacks. The operations further include deploying the one or more software agents for execution on the host computing system during the training exercise to emulate the one or more cyber-attacks against the host computing system using the one or more operational networks.

The details of one or more examples are set forth in the accompanying drawings and the description below. Other features, objects, and advantages of the disclosure will be apparent from the description and drawings, and from the claims.

DETAILED DESCRIPTION

Figure 1:
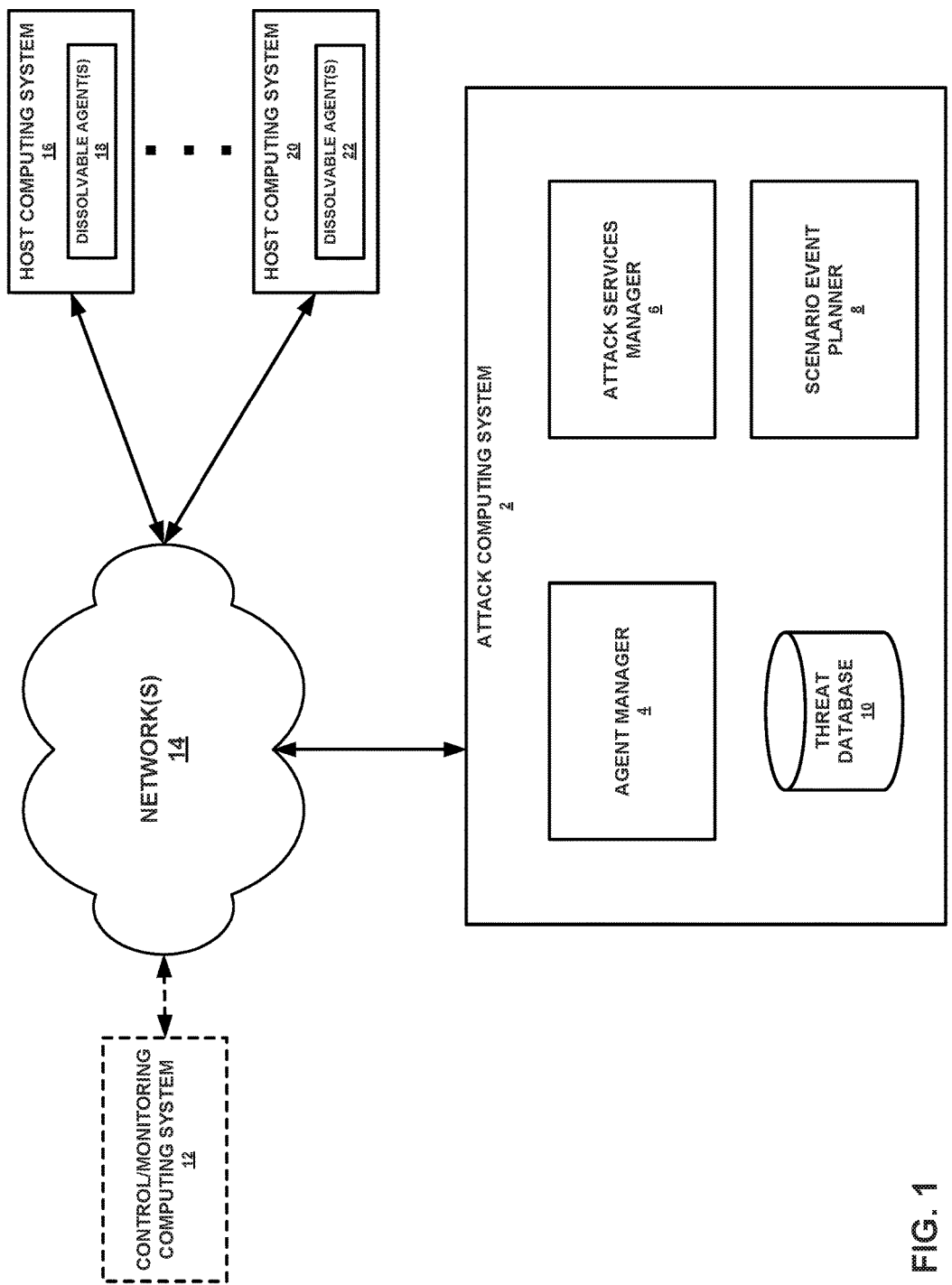
FIG. 1 is a block diagram illustrating an example attack computing system that is configured to deploy dissolvable software agents on one or more host computing systems, in accordance with one or more aspects of the present disclosure.

As noted above, in order to combat the growing sophistication and frequency of cyber-attacks, the nation's cyber-warriors must train vigilantly. Computer network defense training currently takes place either on operational networks or in virtual (e.g., simulated) environments. Virtual environments are typically implemented using virtual machines that isolate the network, allowing real-world attacks to be used safely. Once an exercise is complete, the virtual machines are restored to a clean state. These two training environments—operational and virtual—each have advantages and disadvantages.

One major drawback to using virtual environments is that they lack a sufficient amount of realism. For example, realistic, non-exercise network traffic (e.g., noise) is usually omitted from a virtual environment, often making it very easy to identify malicious traffic. In contrast, training on operational networks provides a full-fidelity environment. However, the attackers are typically placed under significant restrictions to protect the operational network, in that they typically cannot disrupt or damage network resources during the course of the exercise. Similarly, defenders are limited in how they can detect and react to events during an exercise.

Emulations of realistic cyber threats such as viruses, malware, spear phishing, and the like, which can be safely and securely deployed on operational networks and systems, are needed to advance the state of the art in integrated computer network defense training. Emulations of cyber threats should be realistic and current, but should not harm the underlying network infrastructure or host systems.

The present disclosure describes techniques for emulating attacks (e.g., cyber-attacks) on operational networks and restoring systems to pre-exercise states at the conclusion of a training exercise. The techniques implement remote-controlled software agents and lightweight virtualized services to emulate attacks and provide training-specific attacker resources. The techniques protect network resources of these operational networks during training exercises, without necessarily limiting the actions of the training participants, thereby enabling training to take place on the networks while preserving the fidelity of attack actions and defender responses. Training with the realism of operational networks, together with realistic but safe attacks, provides the benefits of both real and virtual training environments and results in better training. Better training improves the readiness of the nation's cyber-warriors to quickly detect and repel current and emerging cyber threats.

The software agents that are used to emulate attacks may be referred to as dissolvable software agents that are configured to save the state of a host system, emulate a computer attack against that system, and then restore the system state at the conclusion of the attack or training exercise. For example, in one non-limiting case during a training exercise, a dissolvable agent, which may be configured for the exercise by a white team member, is sent to a user's workstation where it begins a network scan. At the completion of the exercise, the agent is deleted from the host, leaving no trace.

These dissolvable agents are configurable software agents that may be deployed within a network during a given training exercise, without necessarily requiring any pre-installed software on the targeted host systems. These agents are dissolvable because they are capable of being deleted, or of deleting themselves and their artifacts, leaving little to no trace on the host system after they are run. Upon being deployed on target host system, the dissolvable agents are capable of emulating a wide range of computer-based attacks, such as denial of service, malware injection via spear-phishing emails, and insider attacks (e.g., data exfiltration or internal network scanning). In some cases, exercise planners and/or white-team members can configure the agents for specific exercise scenarios. The agents may also be built on an extensible architecture that enables subject matter experts to implement new agents that emulate new and emerging threats over time.

FIG. 1 is a block diagram illustrating an example attack computing system 2 that is configured to deploy dissolvable software agents 18, 22 on one or more host computing systems 16, 20, respectively, in accordance with one or more aspects of the present disclosure. As shown in FIG. 1, attack computing system 2 is communicatively coupled to one or more networks 14, which may comprise one or more wired and/or wireless networks. One or more host computing systems 16, 20 are also communicatively coupled to networks 14. In some cases, an optional control/monitoring computing system 12 is also communicatively coupled to networks 14. Control/monitoring computing system 12 may be configured to control and/or monitor attack computing system 2 and host computing systems 16, 20. Networks 14 may comprise real-world, operational networks, as opposed to virtual networks.

Each of attack computing system 2, host computing system 16, host computing system 20, and control/monitoring computing system 12 may comprise a computing system that includes one or more desktop computing devices, mobile computing devices (e.g., mobile phones, tablet computers, personal digital assistants (PDA's), laptop computers, wearable computing devices), and/or other type of computing devices. Attack computing system 2, host computing system 16, host computing system 20, and control/monitoring computing system 12 may each include one or more processors and further include, or be otherwise coupled to, one or more display devices. Attack computing system 2, host computing system 16, host computing system 20, and control/monitoring computing system 12 may each include one or more communication units, which are configured to send and receive data. In some examples, these communication units support wireless and/or wired communication and may send and/or receive data using any variety of communication protocols.

Host computing systems 16, 20 may comprise real or virtualized systems. Each of host computing systems 16, 20 may execute one or more respective dissolvable software agents. As shown in FIG. 1, host computing system 16 may be configured to execute one or more dissolvable agents 18, while host computing system 20 may be configured to execute one or more dissolvable agents 22. Attack computing system 2 may utilize agent manager 4 to launch dissolvable agents 18, 22 on host computing systems 16, 20, respectively. Agent manager 4 may be configured to remotely manage and monitor dissolvable agents 18, 22 during execution.

Dissolvable agents 18, 22 may be configured to emulate cyber-attacks and restore normal system operation at the end of a given training exercise on host computing systems 16, 20. Dissolvable agents 18, 22 are configurable software agents that are deployed within host computing systems 16, 20, respectively, during a training exercise, without necessarily requiring any pre-installed software on host computing systems 16, 20. These agents 18, 22 are dissolvable because they are capable of deleting themselves and their artifacts upon execution completion, as well as restoring system state, in order to leave little-to-no trace on the respective host computing system 16, 20 on which they are executed. Dissolvable agents 18, 22 are capable of emulating a wide range of computer-based attacks, such as denial-of-service attacks, malware injection via spear-phishing emails, and/or insider attacks (e.g., data exfiltration or internal network scanning), to name only a few non-limiting examples. Each of dissolvable agents 18, 22 is capable of emulating one or more different cyber-attacks and/or types of cyber-attacks. In many examples, however, each of dissolvable agents 18, 22 may be configured to emulate one particular cyber-attack (or type of cyber-attack). Dissolvable agents 18, 22 may comprise scripts or compiled programs, in various examples.

In some cases, exercise planners and/or white-team members can configure dissolvable agents 18, 22 (e.g., by configuring or using agent manager 4 and/or scenario event planner 8) for specific exercise scenarios. Dissolvable agents 18, 22 may be built on an extensible architecture that enables subject matter experts to implement new agents over the course of time, which may emulate new and emerging threats. Through the use of dissolvable agents, attack computing system 2 and host computing systems 16, 20 enable computer network defense training on operational networks (e.g., operational networks 14) without the risk of damaging mission critical systems.

As shown in FIG. 1, attack computing system 2 includes agent manager 4, attack services manager 6, threat database 10, and scenario event planner 8. Agent manager 4 may be configured to deploy, manage, and/or monitor dissolvable agents that are used in different host computing systems, such as host computing systems 16, 18 shown in FIG. 1. As will be described in further detail below, agent manager 4 may have access to a master scenario event list (MSEL), which is a collection of events that are intended to guide an exercise towards specific outcomes, serving as a script for the execution of the exercise. The exercise planning process typically determines the participants, exercise scenario, and the execution order for the course of the exercise. Typically, exercise planners may interact with or otherwise utilize scenario event planner 8 to plan one or more exercises and/or scenarios, thereby developing MSEL's for particular exercises. A given MSEL may include the ordering of events, time of occurrence or execution of events, a target of the events, a description of the events, assumptions/notes, expected actions from the training participants, and/or a measure of performance for a particular scenario or exercise. A cyber exercise may run as a stand-alone event on an isolated network or as an activity within a larger training exercise on an operational network. Threat database 10 and/or scenario event planner 8 may store one or more MSEL's that are associated with one or more exercises or scenarios. Various different scenarios may be executed during the course of a given exercise.

In some examples, scenario event planner 8 may provide a graphical application and/or user interface that is used by an exercise planner or trainer to develop one or more MSEL's for training exercises. Scenario event planner 8 may assist in the configuration of dissolvable agents (e.g., dissolvable agents 18, 22) and attack services for an exercise, such as attack services provided by attack services manager 6, as described in further detail below. In some cases, scenario event planner 8 may enable a user to select from available attack emulations and customize those attacks for a given exercise. Scenario event planner 8 may also be configured to add new threats to threat database 10, or to update the threat information contained in threat database 10 for existing threats.

In certain cases, scenario event planner 8 may, during a given exercise, provide situational awareness and direct command and control of dissolvable agents 18, 22 via a graphical user interface. For example, the graphical user interface may enable a user to interact with or manage the functionality provided by agent manager 4, attack services manager 6, and/or threat database 10 to control one or more aspects of an exercise and/or to control the operation of dissolvable agents 18, 22. For instance, a user may utilize the graphical user interface to monitor the activity of or terminate any one of dissolvable agents 18, 22 during operation.

As will be described in further detail below, agent manager 4 may, for a particular exercise, read a corresponding MSEL file, such as a MSEL file stored or otherwise provided by scenario event planner 8. Agent manager 4 may then configure one or more dissolvable agents, such as dissolvable agents 18, 22, based on the MSEL for that exercise. Agent manager 4 may then deploy the dissolvable agents 18, 22 to corresponding hosts, such as host computing systems 16, 20.

For example, in a non-limiting case, a particular MSEL for a training exercise may include an event, or inject, associated with a scenario for providing an email message that includes a link to a file stored on an external server that contains malware (e.g., as part of a phishing attack). Upon reading the MSEL file and parsing the information for this event, agent manager 4 may create or configure a first dissolvable agent that is capable of providing such an email message. Agent manager 4 may deploy this agent as a first one of dissolvable agents 18 that is executed on host computing system 16, and/or as a first one of dissolvable agents 22 that is executed on host computing system 20. The MSEL may include another event associated with a scenario for performing a malicious scan of a host system. Upon reading the MSEL file and parsing the information for this event, agent manager 4 may create or configure a second dissolvable agent that is capable of performing such a malicious scan. Agent manager 4 may then deploy this agent as a second one of dissolvable agents 18 that is executed on host computing system 16, and/or as a second one of dissolvable agents 22 that is executed on host computing system 20. The MSEL file may include information indicating a time of execution of each of these event scenarios, and may also include information indicating expected actions and measure of performance for these scenarios by the exercise participants. Agent manager 4 may use the time of execution information to configure the timeframe for execution of dissolvable agents 18, 22 on respective host computing systems 16, 22.

Once dissolvable agents 18, 22 are deployed, agent manager 4 may be configured to monitor the state of dissolvable agents 18, 22, as well as communicating with these agents during execution. For example, in some cases, agent manager 4 may communicate with a component in each of dissolvable agents 18, 22 that is responsible for controlling the lifecycle of the respective agent. Agent manager 4 is capable of terminating any executing agents, such as dissolvable agents 18, 22, at the completion of a particular exercise scenario or of the exercise in general. In certain examples, agent manager 4 may utilize a remote agent launch framework to copy and launch agents on remote computing systems, such as host computing systems 16, 20.

Agents are capable of saving and restoring state on host systems. For example, after initiation of execution, dissolvable agents 18 are capable of saving, or backing up, state information on host computing system 16 prior to performing operations on the system. After completion or termination, dissolvable agents 18 are then capable of restoring this state information on host computing system 16, including restarting any pre-existing applications or services and/or restoring network connectivity between host computing system 16 and other systems that were previously terminated as a result of initiated cyber-attacks. In such fashion, dissolvable agents 18 are capable of restoring system state on host computing system 16. Dissolvable agents 22 are capable of performing similar back-up and restore actions with respect to host computing system 20.

Attack computing system 2 also includes an attack services manager 6. Attack services manager 6 may provide additional functionality by implementing a number of services that are used during cyber-attack exercises or scenarios. For example, as described in further detail below in reference to FIG. 2, attack services manager 6 may provide services for one or more of a web server, an email server, or a secure shell (SSH) server. In various cases, these services may take the place of resources that would be part of a real-world cyber-attack but are not already part of the operational network provided by networks 14 and host computing systems 16, 20. For example, in a real-world phishing attack, a malicious hyperlink sent via email accesses a website hosted by the attacker that serves malware to the victim's computer. As noted in the non-limiting example above, one of the agents deployed by agent manager 4, such as one of dissolvable agents 18 executed on host computing system 16, may be configured to provide such an email as part of a phishing attack training exercise. In order to implement such an attack, a server is needed to host a phishing website that is accessed by host computing system 16. Attack services manager 6 may provide such a service that is configured to host a temporary, internal phishing website that serves mock (e.g., realistic but potentially not dangerous) malware to host computing system 16 during execution of the dissolvable agent. In some examples, scenario event planner 8 may (e.g., via user input) modify or configure the services that are provided by attack services manager 6.

Attack services manager 6 may, in various cases, utilize one or more virtualization technologies to provide individual services. The use of such virtualization technologies may provide numerous advantages to using virtualization. For example, virtualized systems may be configured, initiated, and terminated with relative ease. In addition, each virtualized service provided by attack services manager 6 may appear on a network as a unique network host, increasing the realism of any given exercise. Furthermore, virtualized services are often easy to restore to a previous, saved state, ensuring that any data collected by the service during an exercise, such as files, credentials, or personally identifiable information, is deleted at the end of the exercise. The attack services manager 6 may be extensible to host additional services and accommodate new and emerging attack methodologies.

Threat database 10 may store information about existing cyber threats and the agents that emulate them. It may be updated over time (e.g., by scenario event planner 8) to include emerging cyber threats and additional agents. The threat database may also be used to store information about specific exercises so that they can be reviewed and replayed by attack computing system 2. This type of exercise information stored in threat database may include information about which dissolvable agents (e.g., dissolvable agents 18, 22) were used during a given scenario or training exercise, the specific configurations of these agents, and duration of the exercise, to name a few examples.

In addition, threat database 10 may also store information regarding any effects of attacks that are performed by attack computing system 2 using dissolvable agents 18, 22, such as information about resources of host computing systems 16, 20 (e.g., network resources, computing resources, storage resources) that may be affected or disrupted by the attacks. In some cases, threat database 10 may also store appropriate save-and-restore operations that are associated with attacks performed by attack computing system 2 using dissolvable agents 18, 22. Furthermore, threat database may also store exercise-specific configurations, scenario event lists (e.g., MSEL's associated with different exercises), and data/metrics collected during the training exercises that may be useful in exercise hotwashes and/or after-action reviews.

As described above, an optional control/monitoring computing system 12 may also be communicatively coupled to networks 14. Control/monitoring computing system 12 may, in some cases, be configured to control one or more aspects of training exercises. For example, a user may utilize control/monitoring system 12 to control or manage scenario event planner 8, attack services manager 6, and/or agent manager 4 of attack computing system 2. In addition, control/monitoring computing system 12 may also, in some cases, be configured to control one or more aspects of dissolvable agents 18, 22 that are deployed in host computing systems 16, 20, respectively. Control/monitoring computing system 12 may be configured to perform one or more monitoring functions, such as monitoring the exercise scenarios as they are executed and/or the operations of dissolvable agents 18, 20. In performing such monitoring functions, control/monitoring computing system 12 may store or otherwise record the results of such monitoring functions as monitoring information on control/monitoring computing system 12 and/or attack computing system 2. This monitoring information may, in some cases, include state information about dissolvable agents 18, 20 and/or information about exercises that are executed.

According to various examples, attack computing system 2 may store a scenario event list (e.g., MSEL) that defines one or more events associated with a training exercise. Attack computing system 2 may configure, based on the one or more events defined in the scenario event list, dissolvable agents 18 to emulate one or more cyber-attacks against host computing system 16 during the training exercise, where attack computing system 2 is communicatively coupled to host computing system 16 via networks 14. Attack computing system 2 may deploy dissolvable agents 18 for execution on host computing system 16 during the training exercise to emulate the one or more cyber-attacks against host computing system 16 using networks 14. Dissolvable agents 18 are configured to save a state of one or more resources of host computing system 16 prior to emulating the one or more cyber-attacks against host computing system 16. Dissolvable agents 18 are further configured to restore the state of the one or more resources of host computing system 16 upon conclusion of the one or more cyber-attacks, and prior to termination of dissolvable agents 18.

Similarly, attack computing system 2 may configure, based on the one or more events defined in the scenario event list, dissolvable agents 22 to emulate one or more cyber-attacks against host computing system 20 during the training exercise, where attack computing system 2 is communicatively coupled to host computing system 20 via networks 14. Attack computing system 2 may deploy dissolvable agents 22 for execution on host computing system 20 during the training exercise to emulate the one or more cyber-attacks against host computing system 20 using networks 14. Dissolvable agents 22 are configured to save a state of one or more resources of host computing system 20 prior to emulating the one or more cyber-attacks against host computing system 20. Dissolvable agents 22 are further configured to restore the state of the one or more resources of host computing system 20 upon conclusion of the one or more cyber-attacks, and prior to termination of dissolvable agents 22.

Figure 2:
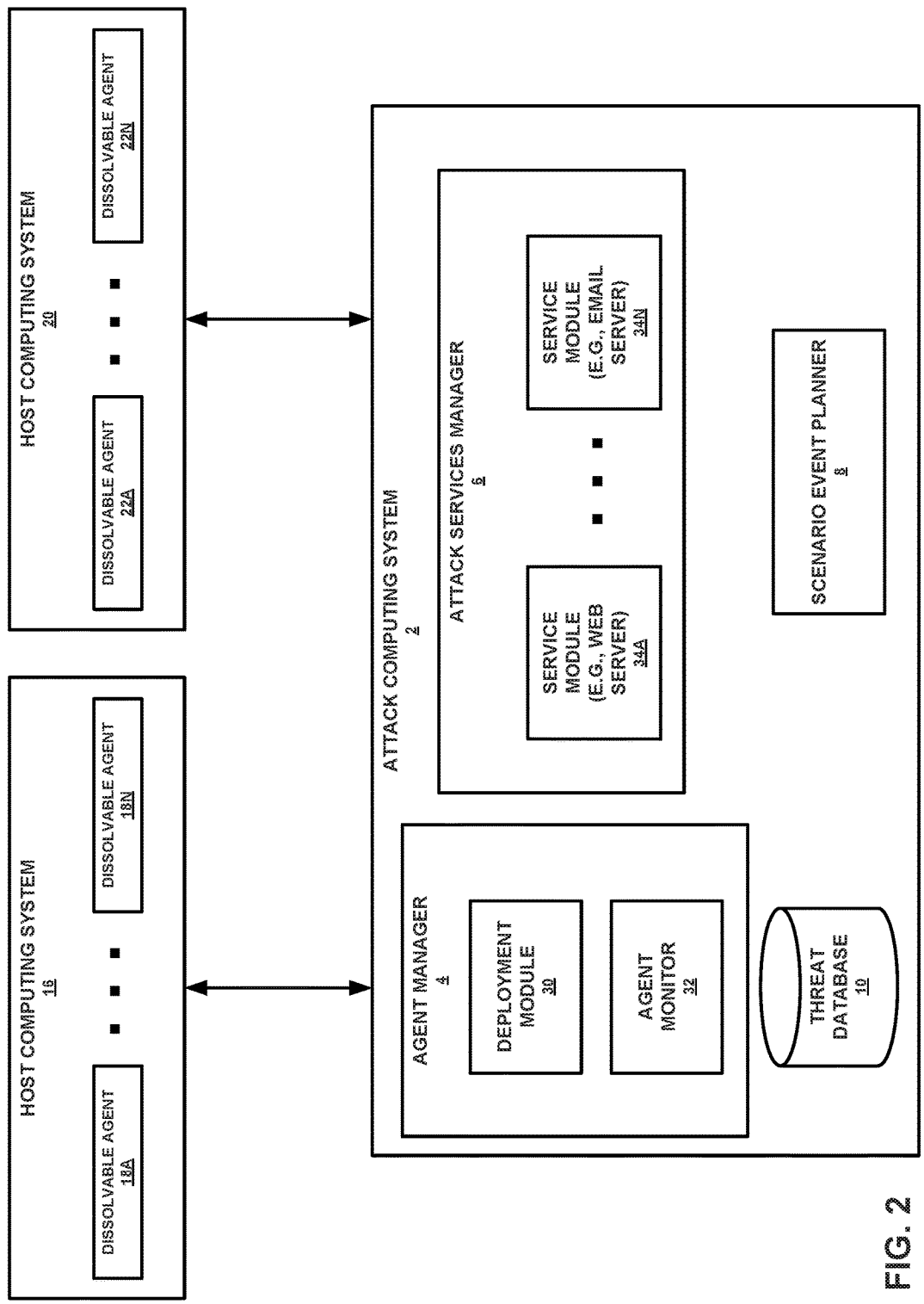
FIG. 2 is a block diagram illustrating further example details of the attack computing system and host computing systems shown in FIG. 1, in accordance with one or more aspects of the present disclosure.

FIG. 2 is a block diagram illustrating further example details of attack computing system 2 and host computing systems 16, 20 shown in FIG. 1, in accordance with one or more aspects of the present disclosure. Although not shown in FIG. 2, each of attack computing system 2 and host computing systems 16, 20 may be communicatively coupled to one or more networks, such as networks 14 shown in FIG. 1.

As again illustrated in FIG. 2, attack computing system 2 includes agent manager 4, threat database 10, attack services manager 6, and scenario event planner 8. Agent manager 4 may include a deployment module 30 and an agent monitor 32. Deployment module 30 may be configured to deploy one or more dissolvable agents on host systems, such as host computing systems 16, 20. For example, deployment module 30 is operable to deploy dissolvable agents 18A-18N on host computing system 16, and to further deploy dissolvable agents 22A-22N on host computing system 20, as illustrated in FIG. 2.

Each of host computing systems 16, 20 may execute one or more dissolvable agents. For example, as illustrated in FIG. 2, host computing system 16 may execute one or more dissolvable agents 18A-18N, and host computing system 20 may execute one or more dissolvable agents 22A-22N. Each individual agent 18A-18N and 22A-22N is capable of performing actions that are associated with a given event or scenario (e.g., an event or scenario defined in an MSEL file for a given exercise). For instance, if an MSEL file defines two distinct scenarios, deployment module 30 may deploy dissolvable agent 18A to perform actions for one scenario and dissolvable agent 18N to perform actions for another scenario. In some cases, a given agent may be capable of performing actions that are associated with multiple events or scenarios. For example, in these cases, a given agent, such as agent 18A, may be capable of performing actions for multiple different scenarios in a given exercise.

As discussed above, agent manager 4 may, for any given exercise, read corresponding scenario event information (e.g., an MSEL file) that is stored or otherwise provided by scenario event planner 8. In particular, deployment module 30 may process the scenario event information and configure one or more dissolvable agents, such as dissolvable agents 18A-18N and/or dissolvable agents 22A-22N, for the given exercise. Deployment module 30 may then deploy the dissolvable agents 18A-18N and 22A-22N to corresponding host computing systems 16 and 20.

For example, in a non-limiting case, a particular MSEL for a training exercise may include two distinct events, or injects, associated with different scenarios of the exercise. Upon reading the MSEL file and parsing the information for these two events, deployment module 30 may create or configure a first dissolvable agent that is capable of performing or otherwise processing the first event. Deployment module 30 may deploy dissolvable agent 18A for execution on host computing system 16. In addition, deployment module 30 may deploy dissolvable agent 22A for execution on host computing system 20. Dissolvable agent 18A is configured to perform or otherwise process this first event on host computing system 16, and dissolvable agent 22A is configured to perform or otherwise process this first event on host computing system 20.

The MSEL file may include information indicating a time of execution of each of these two event scenarios. Based on this information, deployment module 30 may configure the dissolvable agents for corresponding times of execution. For example, the MSEL file may indicate that the first event is to be executed at 12 pm and that the second event is to be executed at 1 pm. Based on this information, deployment module 30 may configure dissolvable agent 18A for execution at 12 pm on host computing system 16, and may configure dissolvable agent 22A for execution also at 12 pm on host computing system 20. Additionally, deployment module 30 may configure dissolvable agent 18N for execution at 1 pm on host computing system 16 to perform or otherwise process the second event, and may configure dissolvable agent 22N for execution also at 1 pm on host computing system 20 with respect to the same second event.

Once dissolvable agents 18A-18N and 22A-22N are deployed, agent monitor 32 may be configured to monitor the state of these agents, as well as communicating with these agents during execution. For example, agent monitor 32 may communicate with a component in each of the dissolvable agents that is responsible for controlling the lifecycle of the respective agent, as will be described in further detail below. Agent monitor 32 may monitor the progress and actions performed by dissolvable agents 18A-18N on host computing system 16, and by dissolvable agents 22A-22N on host computing system 20. Agent monitor 32 may also monitor the times of execution of these dissolvable agents on the respective host computing systems, including times when particular actions are performed. In some cases, agent monitor 32 may store information (e.g., in one or more log files on attack computing system 2) associated with the monitoring operations that are performed by agent monitor 32.

Deployment module 30 is capable of terminating any executing agents, such as one or more of dissolvable agents 18A-18N and 22A-22N, at the completion of a particular exercise scenario or of the exercise in general. For example, at the completion of a first scenario associated with the first event described in the example above (e.g., at a point in time after 12 pm), deployment module 30 may terminate dissolvable agent 18A on host computing system 16 and dissolvable agent 22A on host computing system 20. At the completion of a second scenario associated with the second event described in the example above (e.g., at a point in time after 1 pm), deployment module 30 may terminate dissolvable agent 18N on host computing system 16 and dissolvable agent 22N on host computing system 20.

In some cases, the dissolvable agents are capable of self-destructing of self-terminating based on their configurations. For instance, in the example above, rather than deployment module 30 terminating dissolvable agents 18A-18N and 22A-22N, these agents may be capable of self-terminating at the respective completion times or at other pre-determined times based upon the configuration of these agents. Additionally, deployment module 30 is capable of terminating any of dissolvable agents 18A-18N and/or 22A-22N at any time, on an ad-hoc basis. For example, a user such as a trainer or administrator may decide to terminate a given event or training scenario at a particular point in time. Based on user input, deployment module 30 may then terminate any one of agents 18A-18N and/or 22A-22N that correspond to this training scenario.

In certain examples, deployment module 30 may utilize a remote agent launch framework to transmit and initiate execution of agents on remote computing systems, such as host computing systems 16, 20. An example of such a remote agent launch framework is outlined in U.S. Patent Application Publication No. 2012/0210427 by Bronner et al., published on Aug. 16, 2012 and entitled "Configurable Investigative Tool," and in U.S. Patent Application Publication No. 2012/0209983 by Bronner et al., published on Aug. 16, 2012 and entitled "Configurable Forensic Investigative Tool," which are each incorporated by reference herein in its entirety.

Attack services manager 6 may provide additional functionality by implementing a number of services that are used during cyber-attack exercises or scenarios. For example, attack services manager 6 may provide services for one or more of a web server, an email server, or a secure shell (SSH) server. In various cases, these services may take the place of resources that would be part of a real-world cyber-attack. As shown in the example of FIG. 2, attack services manager 4 includes one or more service modules 34A-34N. In one non-limiting example, service module 34A may comprise a web server module and service module 34N may comprise an email server module.

Service modules 34A-34N may correspond to certain events or scenarios in a training exercise, such that they may provide certain services that are used by one or more of dissolvable agents 18A-18N or 22A-22N. For example, for a particular scenario of an exercise, as part of phishing attack, a malicious hyperlink sent via email may access a website hosted by the attacker that serves malware to the victim's computer. In implementing this scenario, which may be modeled or captured in an MSEL file for the exercise, deployment module 30 may deploy dissolvable agent 18A on host computing system 16, where the dissolvable agent 18A is configured to provide or process such an email to a user of host computing system 16, as part of a phishing attack scenario of a training exercise.

In this example, dissolvable agent 18A may be configured to provide such an email as part of a phishing attack training exercise. In order to implement such an attack, a server is needed to host a phishing website that is accessed by host computing system 16. Service module 34A may, in this non-limiting example, provide such a service that is configured to host a temporary, internal phishing website that serves mock malware to host computing system 16 during execution of dissolvable agent 18A.

In other examples, based on the particular events or training scenarios implemented by one or more of dissolvable agents 18A-18N and/or dissolvable agents 22A-22N, service modules 34A-34N may provide functionality for other services that interact with these agents during execution. For example, service module 34N may provide functionality of an email server that is used to interact with one or more of the dissolvable agents. For instance, deployment module 30 may deploy dissolvable agent 22A for execution on host computing system 20 to provide certain functions for one or more email messages as part of another attack. To implement this attack, dissolvable agent 22A may need to interact with an email server. Service module 34N may provide functionality associated with such an email server, and thus may interact directly with dissolvable agent 22A during the exercise.

In such fashion, service modules 34A-34N may provide functionality to interact with one or more of dissolvable agents 18A-18N and/or 22A-22N during execution, such that the agents are capable of performing their intended operations without interacting with real-world services providers (e.g., real-world web servers or real-world email servers). Instead, dissolvable agents 18A-18N and/or 22A-22N interact directly with service modules 34A-34N of attack services manager 6 to carry out the intended functions. Deployment module 30 is capable of configuring dissolvable agents 18A-18N and 22A-22N for deployment on respective host computing systems 16, 20, such that these agents are set up to interact directly with service modules 34A-34N rather than real-world service providers.

As described previously, service modules 34A-34N may, in various cases, utilize one or more virtualization technologies to provide individual services. Virtualized systems may be configured, initiated, and terminated with relative ease. In addition, each virtualized service may appear on a network as a unique network host, increasing the realism of any given exercise. Furthermore, virtualized services are often easy to restore to a previous, saved state, ensuring that any data collected by the service during an exercise, such as files, credentials, or personally identifiable information, is deleted at the end of the exercise.

As noted earlier, agents are capable of saving and restoring state on host systems. For example, upon initiation of execution, dissolvable agents 18A-18N are capable of saving, or backing up, state information on host computing system 16 prior to performing operations on the system. Upon completion or termination, dissolvable agents 18A-18N are then capable of restoring this state information on host computing system 16, including restarting any pre-existing applications or services and/or restoring network connectivity between host computing system 16 and other systems. In such fashion, dissolvable agents 18 are capable of restoring system state on host computing system 16. Dissolvable agents 22A-22N are capable of performing similar back-up and restore actions with respect to host computing system 20.

Figure 3:
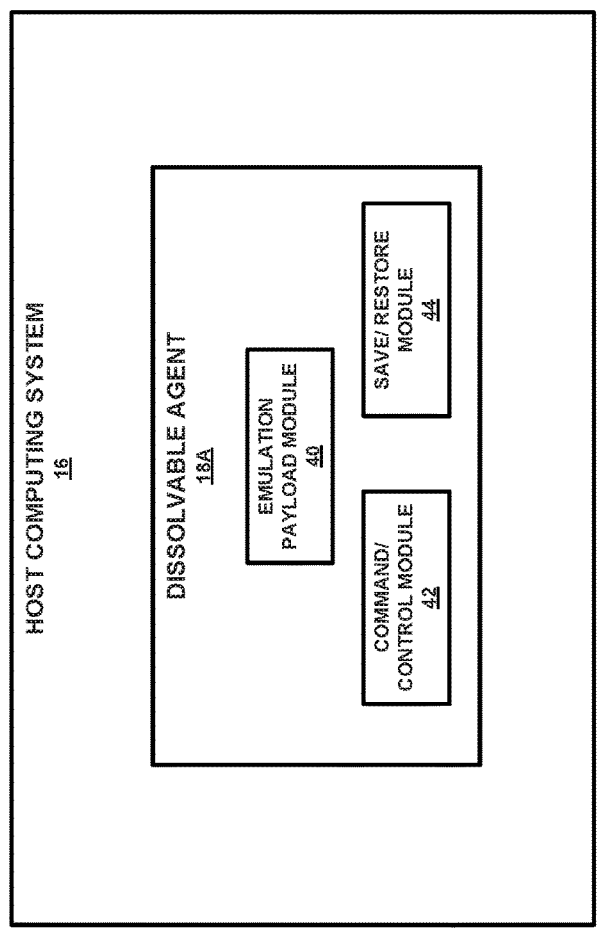
FIG. 3 is a block diagram illustrating one example of further example details of a dissolvable agent, in accordance with one or more aspects of the present disclosure.

FIG. 3 is a block diagram illustrating one example of further example details of a dissolvable agent, in accordance with one or more aspects of the present disclosure. In the example of FIG. 3, dissolvable agent 18A deployed on host computing system 16 is shown for purposes of illustration only. However, the further details of dissolvable agent 18A described in reference to FIG. 3 may also be implemented in any of dissolvable agents 18A-18N or 22A-22N shown in FIG. 2, as well as in any of dissolvable agents 18 or 22 shown in FIG. 1.

As previously described, dissolvable agents, such as dissolvable agent 18A, are typically small software applications that are deployed to, and which execute on, remote hosts, such as host computing system 16. Dissolvable agents, such as dissolvable agent 18A, typically do not require software to be preinstalled on the remote host. Through the use of dissolvable agents, computer network defense training may be provided on operational networks without the risk, or with mitigated risk, of damaging mission critical systems. In some examples, dissolvable agent 18A may execute as a script or as a binary (e.g., pre-compiled and/or linked) program.

As illustrated in FIG. 3, dissolvable agent 18A that is deployed for execution on host computing system 16 includes an emulation payload module 40, a command/control module 42, and a save/restore module 44. Emulation payload module 40 may include a configurable package of components that emulate various cyber-attacks and/or monitoring operations. These components can be hand-written by subject matter experts or generated by tools. The operations performed by emulation payload module 40 may include autonomous actions, such as network port scanning or other actions provided by controllable "bots." The operations can be composed based on events and/or scenarios that are captured and described in a MSEL for a given training exercise (e.g., viruses, malware, spear phishing, denial of service, insider attacks such as data exfiltration or internal network scanning, to name only a few non-limiting examples). In some cases, host computing system 16 may deploy only a single dissolvable agent 18A, thus potentially minimizing the agent's footprint on the system. In the example of FIG. 3, host computing system 16 may deploy only one such dissolvable agent.

As described in reference to FIG. 2, scenario event planner 8 may utilize and/or provide a MSEL in planning on a particular training exercise. The MSEL may define events or scenarios that are part of this exercise, and agent manager 4 may then use this MSEL to deploy dissolvable agents with deployment module 30. Thus, in the example of FIG. 3, deployment module 30 may use an MSEL to deploy dissolvable agent 18A, and may configure emulation payload module 40 to emulate a particular event or scenario of the exercise (e.g., network port scanning, phishing email attack processing). In some cases, emulation payload module 40 may be configured to emulate multiple different events or scenarios of the exercise.

Dissolvable agent 18A also includes command/control module 42. Command/control module 42 is responsible for controlling the lifecycle of dissolvable agent 18A in an effort to keep any attack initiated by emulation payload module 40 under control, mitigating the risk the damaging host computing system 16 or taking it offline.

Command/control module 42 may support multiple modes of command and control such as preset time-to-live and positive agent control. A preset time-to-live value is associated with a predefined amount of time or duration for which dissolvable agent 18A, operating autonomously, is to operate. For example, based on details included in the MSEL, deployment module 30 may configure dissolvable agent 18A such that it has a preset time-to-live value of one hour. In this case, emulation payload module 40 may operate for this period of time in emulating certain monitoring and/or attack operations. At the end of this time period, command/control module 42 may be configured to self-terminate dissolvable agent 18A. As part of this self-termination process, command/control module 42 may invoke save/restore module 44 to restore state information on host computing system 16.

Command/control module 42 may also implement positive agent control. In implementing positive agent control, command/control module 42 may be configured to self-terminate dissolvable agent 18A if it is unable to establish and/or maintain communication with deployment module 30. Typically, deployment module 30 maintains a certain level of connectivity with each of the dissolvable agents it deploys, in order to monitor the activity of these agents, as well as to control and potentially terminate such agents in certain situations. Agents may utilize their respective command/control module (e.g., command/control module 42 of dissolvable agent 18A) to communicate with deployment module 30. However, in some cases, an agent such as dissolvable agent 18A may lose its communication interface with deployment module 30. In these cases, to avoid a loss of control by deployment module 30, deployment module 30 may configure command/control module 42 to self-terminate when such communication is lost for a determined period of time (e.g., longer than a certain number of minutes without recovery). Command/control module 42 invokes save/restore module 44 as part of any termination (e.g., self-termination) process.

In some cases, command/control module 42 may implement positive agent control by attempting to maintain a persistent network connection with deployment module 30. In these cases, deployment module 30 may manage or control this persistent network connection, over which deployment module can issue commands (e.g., "stop and cleanup" command) to any agent under its control. Command/control module 42 may be configured to periodically confirm the existence of this persistent connection with deployment module 30 and self-terminate if the connection is lost.

In some cases, maintaining persistent connections between agents and deployment module 30 may not always be feasible. Thus, in these cases, command/control module 42 may alternatively implement a check-in mechanism by which command/control module 42 periodically contacts, or pings, deployment module 30 to confirm connectivity, and/or to receive information and instructions for proceeding. If command/control module 42 is unable to contact deployment module 30, it may cause dissolvable agent 18A to self-terminate, invoking save/restore module 44 as part of the self-termination process.

System save/restore module 44 works to save system state and restore saved store of host computing system 16. In some cases, system save/restore module 44 may interact with emulation payload module 40 to determine which information of host computing system 16 to save and/or restore. In some cases, threat database 10 (FIG. 1) may store save-and-restore operations that are associated with particular attacks and/or exercises, and save/restore module 44 may identify save-and-restore operations that are associated with an attack or other operation that is performed by emulation payload module 40.

Once a given training exercise has concluded or an emulated cyber-attack has been terminated or is no longer needed (e.g., the attack has been countered), dissolvable agent 18A may use save/restore module 44 to undo or repair any effects of the emulated attacks. Cyber-attacks can affect systems in a variety of ways. For example, services and/or applications can be disabled, registry keys can be modified, and/or files can be changed or replaced. Threat database 10 and/or save/restore module 44 may provide a library for save and restore operations, including, for example, operations to save and restore files (including, e.g., registry keys and values), operations to restart services, and/or operations to invoke custom restoration scripts (e.g., Linux shell scripts or Windows group policy objects) on affected systems. The use of save/restore module 44 enables dissolvable agent 18A to reliably reverse the effects of an attack without having to develop that functionality themselves.

Upon deployment and execution on host computing system 16, save/restore module 44 may save certain state information of host computing system 16 prior to emulation payload module 40 initiating its attack and/or monitoring operations. For example, save/restore module 44 may backup certain files of host computing system 16 that will be modified or deleted by emulation payload module 40. Emulation payload module 40 may identify the files that may be modified or deleted for use by save/restore module 44. For example, for a given scenario, emulation payload module 40 may be configured to modify or delete ten specific files. Prior to perform its programmed attack functions, save/restore module 44 may backup these ten specific files to a backup repository of save/restore module 44. This backup repository is included in host computing system 16. In some cases, the backup repository may be stored on attack computing system 2 (e.g., by agent manager 4 or attack services manager 6). Upon completion of the exercise and the attack functions performed by emulation payload module 40, save/restore module 44 may restore these ten files from the backup repository to their original locations, as also store4d by save/restore module 44, on host computing system 16.

In addition to restoring computer resources such as files, save/restore module 44 may also be configured to restore the state of one or more databases used by host computing system 16, such as one or more portions of the one or more databases. In some cases, save/restore module 44 may save and restore the entire contents of a given database. In other cases, save/restore module 44 may only save and restore subsets or particular portions of data included in a given database.

In some instances, save/restore module 44 may also utilize a "data-splicing" technique to save and restore the entire database while also including or splicing valid modifications made during the attack. In these instances, save/restore module 44 may save data and/or state of the database before or at the onset of an attack and then, during restoration, restore the data and/or state of the database to its pre-attack state, but to also further modify the database based on one or more changes that were made to the database during the exercise. Save/restore module 44 may, in various examples, only modify the database in such fashion when these particular changes made to the database during the course of the exercise were valid modifications, and not database modifications made as part of a particular attack carried out during the exercise. For instance, during the course of a given training exercise, various database modifications may be made as part of a malicious attack to corrupt the database, while other modifications may not be made as part of this attack. One or more of emulation payload module 40, command/control module 42, and/or save/restore module 44 may be able to determine which database modifications were part of a given attack and which database modifications, although made during the training exercise, were valid modifications that were not part of the given attack.

As described above, save/restore module 44 may have further functionality. For example, save/restore module 44 may also be configured to restart any applications and/or services that were halted or terminated by emulation payload module 40 while perform attack operations. In addition, save/restore module 44 may be configured to restore network connectivity of host computing system 16 to one or more external systems, where such connectivity was lost as a result of operations performed by emulation payload module 40. By including a save/restore module 44 that corresponds to and interacts with emulation payload module 40 of dissolvable agent 18A, any emulated attack performed by dissolvable agent 18A can be cleaned up upon termination of dissolvable agent 18A. In some cases, save/restore module 44 is also capable of communicating with virtualization hypervisors, which makes it possible to save the state of an entire virtual system and completely restore it (e.g., if host computing system is implemented as a virtual system).

Through the implementation of dissolvable agents that are deployed by deployment module 30, attack computing system 2 and the deployed agents are capable of realistically emulating cyber-attacks on operational networks (e.g., networks 14). Agent monitor 32 is capable of monitoring the various deployed agents and their associated attack or monitoring functions, and attack services manager 6 may provide various service modules (e.g., service modules 34A-34N shown in FIG. 2) to interact with the deployed agents in order to realistically emulate various services (e.g., services of a web or email server). The dissolvable agents may each individually support multiple modes of command and control (e.g., via functionality provided by command/control module 42), enabling both self- and remote-control of dissolvable agents and the ability to terminate them. Each dissolvable agent has self-terminating functionality, but may also be remotely and independently terminated by agent manager 4. Furthermore, through implementation of save and restore functionality (e.g., via functionality provided by save/restore module 44), dissolvable agents are capable of reliably restored affected systems to their corresponding states prior to initiation of exercises. Save/restore module 44, for example, may use host-based and/or virtualization technologies to perform save and restore operations for any given agent (e.g., dissolvable agent 18A shown in FIG. 3). By realistically emulating cyber-attacks using operational networks, trainees and/or operators are enabled to detect and respond to such attacks in a realistic way.

Figure 4:
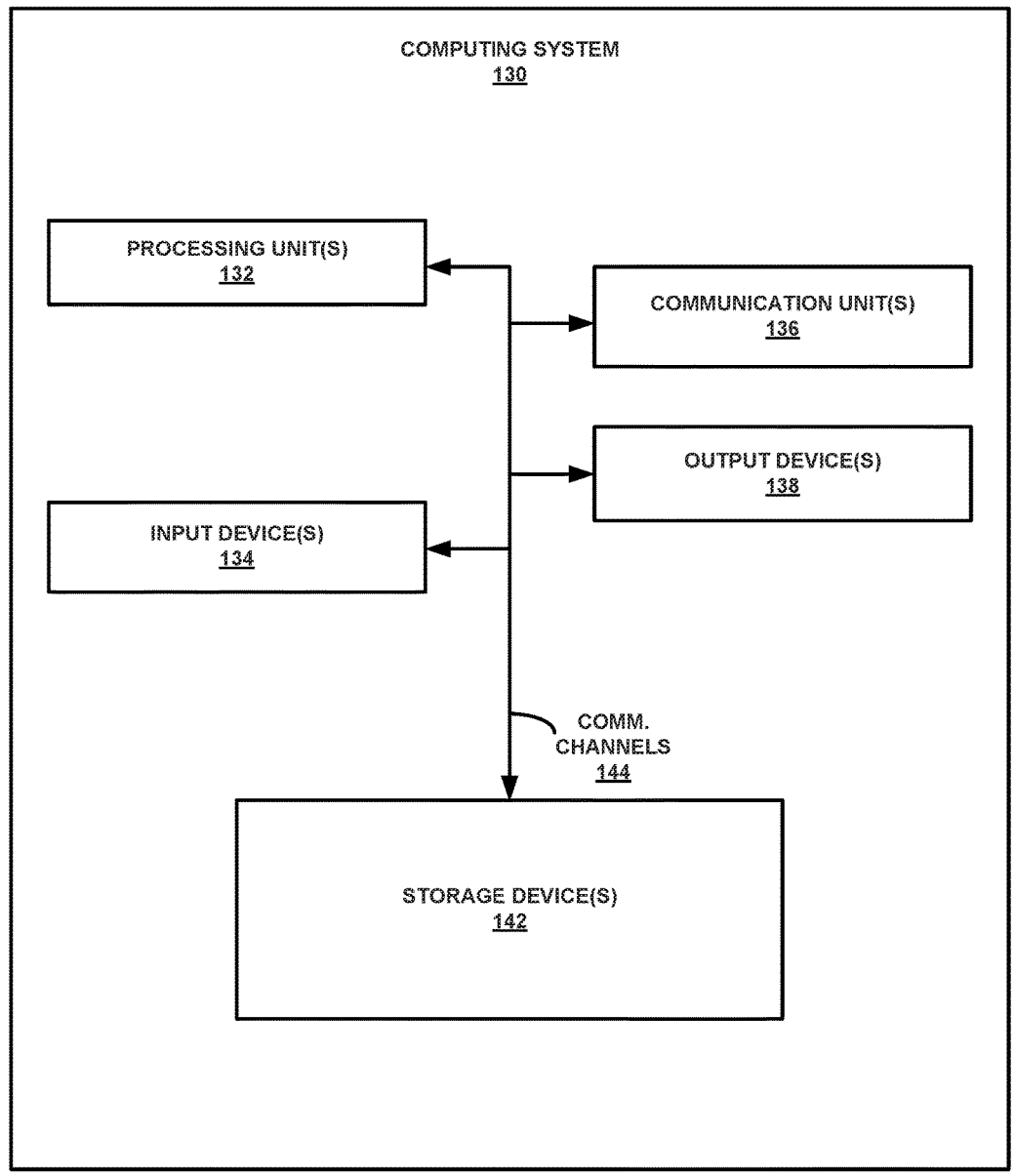
FIG. 4 is a block diagram illustrating further details of an example computing system, such as one or more of the computing systems shown in FIGS. 1-3, in accordance with one or more aspects of the present disclosure.

FIG. 4 is a block diagram illustrating further details of an example computing system 130, such as one or more of the computing systems shown in FIGS. 1-3, in accordance with one or more aspects of the present disclosure. For example, computing system 130 may be an example of one or more of control/monitoring computing system 12, host computing system 16, host computing system 20, and/or attack computing system 2. FIG. 4 illustrates only one particular example of computing system 130, and many other examples of computing system 130 may be used in other instances and may include a subset of the components shown, or may include additional components not shown, in FIG. 4.

As shown in the example of FIG. 4, computing system 130 includes one or more processing units 132, one or more input devices 134, one or more communication units 136, one or more output devices 138, and one or more storage devices 142. In some examples, computing system 120 may not include input devices 134 and/or output devices 138. Communication channels 144 may interconnect each of the components 132, 134, 136, 138, and 142 for inter-component communications (physically, communicatively, and/or operatively). In some examples, communication channels 144 may include a system bus, a network connection, an inter-process communication data structure, or any other method for communicating data between hardware and/or software.

One or more input devices 134 of computing system 130 may receive input. Examples of input are tactile, audio, and video input. Examples of input devices 134 include a presence-sensitive screen, touch-sensitive screen, mouse, keyboard, voice responsive system, video camera, microphone or any other type of device for detecting input from a human or machine.

One or more output devices 138 of computing system 130 may generate output. Examples of output are tactile, audio, and video output. Examples of output devices 138 include a presence-sensitive screen, sound card, video graphics adapter card, speaker, cathode ray tube (CRT) monitor, liquid crystal display (LCD), or any other type of device for generating output to a human or machine. Output devices 138 may include display devices such as cathode ray tube (CRT) monitor, liquid crystal display (LCD), or any other type of device for generating tactile, audio, and/or visual output.

One or more communication units 136 of computing system 130 may communicate with one or more other computing systems or devices via one or more networks by transmitting and/or receiving network signals on the one or more networks. Examples of communication units 136 include a network interface card (e.g. such as an Ethernet card), an optical transceiver, a radio frequency transceiver, or any other type of device that can send and/or receive information, such as through a wired or wireless network. Other examples of communication units 136 may include short wave radios, cellular data radios, wireless Ethernet network radios, as well as universal serial bus (USB) controllers. Communication units 136 may provide wired and/or wireless communication.

One or more storage devices 142 within computing system 130 may store information for processing during operation of computing system 130 (e.g., computing system 130 may store data accessed by one or more modules, processes, applications, or the like during execution at computing system 130). In some examples, storage devices 142 on computing system 130 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 142, in some examples, also include one or more computer-readable storage media. Storage devices 142 may be configured to store larger amounts of information than volatile memory. Storage devices 142 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 142 may store program instructions and/or data associated with one or more software/firmware elements or modules.

For example, when computing system 130 comprises an example of host computing system 16, storage devices 142 may store instructions and/or data associated with dissolvable agents 18 (which may include, for example, instructions and/or data associated with emulation payload module 40, command/control module 42, and save/restore module 44 for each of dissolvable agents 18, such as shown in the example of dissolvable agent 18A in FIG. 3). When computing system 130 comprises an example of host computing system 20, storage devices 142 may store instructions and/or data associated with dissolvable agents 22 (which may include, for example, instructions and/or data associated with emulation payload module 40, command/control module 42, and save/restore module 44 for each of dissolvable agents 22, such as shown in the example of dissolvable agent 18A in FIG. 3).

When computing system 130 comprises an example of attack computing system 2, storage devices 142 may store instructions and/or data associated with agent manager 4, attack services manager 6, and scenario event planner 8. Regarding agent manager 4, storage devices 142 may store instructions and/or data associated with deployment module 30 and agent monitor 32. Regarding attack services manager 6, storage devices 142 may store instructions and/or data associated with service modules 34A-34N. Storage devices 142 may also store threat database 10.

Storage devices 142 may further store instructions and/or data associated with an operating system, which may be used by computing system 130 during operation. As described herein, computing system 130 may utilize one or more different operating systems (e.g., FreeBSD, Linux).

Computing system 130 further includes one or more processing units 132 that may implement functionality and/or execute instructions within computing system 130. For example, processing units 132 may receive and execute instructions stored by storage devices 142 that execute the functionality of the elements and/or modules described herein. These instructions executed by processing units 132 may cause computing system 130 to store information within storage devices 142 during program execution. Processing units 132 may also execute instructions of the operating system to perform one or more operations described herein.

Figure 5:
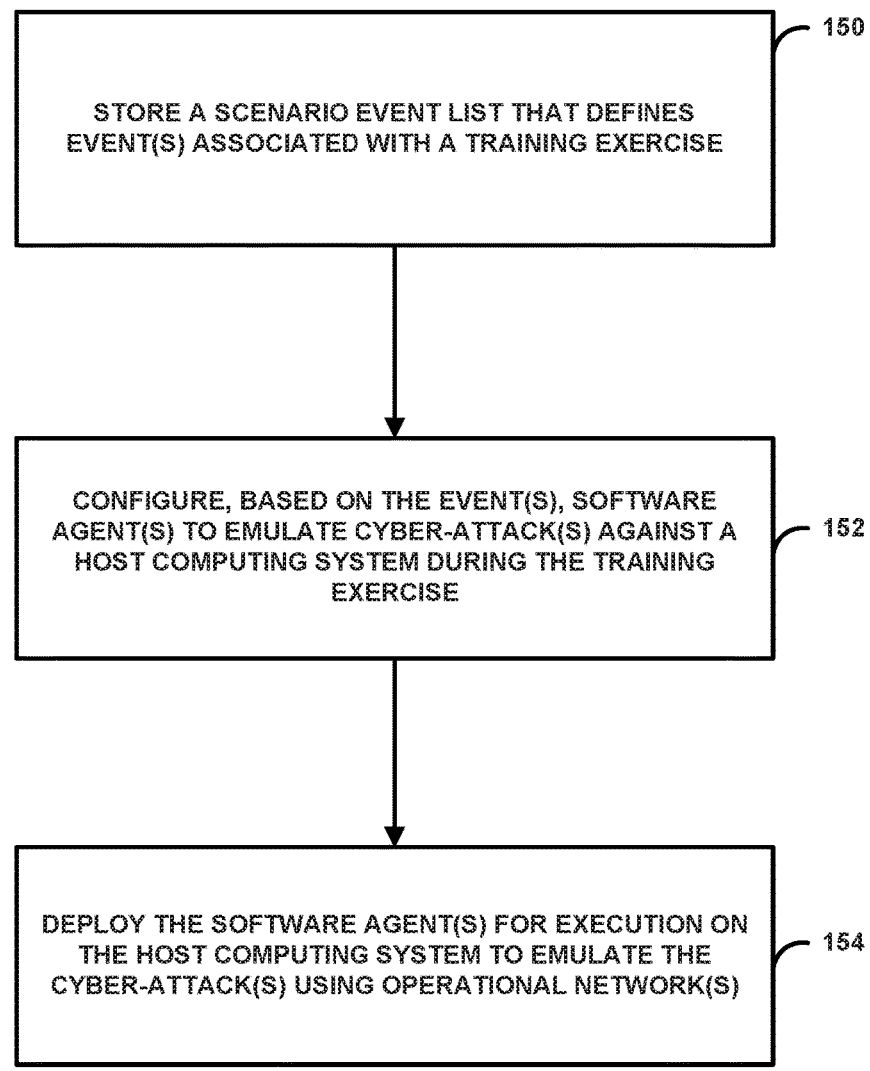
FIG. 5 is a flow diagram illustrating an example process that may be performed by a computing system, such as one or more of the computing systems shown in FIGS. 1-4, in accordance with one or more aspects of the present disclosure.

FIG. 5 is a flow diagram illustrating an example process that may be performed by a computing system, such as one or more of the computing systems shown in FIGS. 1-4, in accordance with one or more aspects of the present disclosure. For example, the process illustrated in FIG. 5, which comprises one or more operations, may be performed by attack computing system 2.

As illustrated in FIG. 5, the process includes storing, by an attack computing system (e.g., attack computing system 2), a scenario event list that defines one or more events associated with a training exercise (150). The process further includes configuring, by the attack computing system and based on the one or more events defined in the scenario event list, one or more software agents (e.g., one or more dissolvable agents 18) to emulate one or more cyber-attacks against a host computing system (e.g., host computing system 16) during the training exercise, where the attack computing system is communicatively coupled to the host computing system via one or more operational networks (e.g., networks 14) (152).

The attack computing system configures the one or more software agents to save a state of one or more resources of the host computing system prior to emulating the one or more cyber-attacks against the host computing system. The attack computing system further configures the one or more software agents to restore the state of the one or more resources of the host computing system upon conclusion of the one or more cyber-attacks. The process illustrated in FIG. 5 further includes deploying, by the attack computing system, the one or more software agents for execution on the host computing system during the training exercise to emulate the one or more cyber-attacks against the host computing system using the one or more operational networks (154).

In some examples, deploying the one or more software agents for execution on the host computing system during the training exercise includes transmitting, by the attack computing system, the one or more software agents to the host computing system, after transmitting the one or more software agents to the host computing system, initiating, by the attack computing system, execution of the one or more software agents on the host computing system during the training exercise. In some examples, configuring the one or more software agents to save the state of the one or more resources of the host computing system includes configuring, by the attack computing system, the one or more software agents to back up one or more of (a) at least one file or (b) at least one portion of a database of the host computing system prior to emulating the one or more cyber-attacks. In these examples, configuring the one or more software agents to restore the state of the one or more resources of the host computing system includes restoring, by the attack computing system, the one or more of (a) the at least one file or (b) the at least one portion of the database of the host computing system upon conclusion of the one or more cyber-attacks.

In some examples, configuring the one or more software agents to restore the state of the one or more resources of the host computing system includes configuring, by the attack computing system, the one or more software agents to restore the state of the one or more resources of the host computing system at least by one or more of (a) restoring one or more network connections between the host computing system and one or more external devices are terminated during the one or more cyber-attacks, or (b) restarting one or more applications or services that are terminated during the one or more cyber-attacks. In some examples, the scenario event list further defines one or more respective times at which the one or more events occur during the training exercise occur, and deploying the one or more software agents for execution of the host computing system during the training exercise includes determining, by the attack computing system, one or more respective times for initiating the one or more cyber-attacks by the one or more software agents based on the one or more respective times at which the one or more events occur during the training exercise.

In some examples, the process illustrated in FIG. 5 further includes executing, by the attack computing system, one or more attack services that are configured to provide one or more attack resources that are used by the one or more software agents during the one or more cyber-attacks, and, upon conclusion of the training exercise, deleting, by the attack computing system, data collected by the one or more attack services during the training exercise. The one or more attack services may include one or more of a web server or an email server.

In some examples, the processor illustrated in FIG. 5 further includes storing, by the attack computing system, a threat database that includes information associated with one or more of (a) the one or more cyber-attacks, (b) configuration of the one or more software agents that are used to emulate the one or more cyber-attacks, (c) the one or more events defined in the scenario event list, (d) a duration of the training exercise, (e) the one or more resources of the host computing system that are affected by the one or more cyber-attacks, and (f) save and restore operations associated with the one or more cyber-attacks that are used by the one or more software agents to save and restore the state of the one or more resources of the host computing system.

In some examples, configuring the one or more software agents includes configuring, by the attack computing system, at least one software agent of the one or more software agents to self-terminate its respective execution after a respective amount of time. In some examples, configuring the one or more software agents includes configuring, by the attack computing system, at least one software agent of the one or more software agents to self-terminate its respective execution responsive to determining that the at least one software agent is unable to establish or maintain communication with the attack computing system via the one or more operational networks.

In some examples, the one or more software agents include a single software agent that is deployed for execution on the host computing system during the training exercise. In some examples, the process illustrated in FIG. 5 further includes, after deploying the one or more software agents for execution on the host computing system, receiving, by the attack computing system and from the host computing system via the operational network, status information associated with execution of the one or more software agents. In some examples, the process illustrated in FIG. 5 further includes, upon conclusion of the training exercise, terminating, by the attack computing system, execution of the one or more software agents on the host computing system.

In some examples, the host computing system comprises a virtualized computing system that includes one or more virtual machines. In some examples, configuring the one or more software agents includes configuring, by the attack computing system, a first software agent to emulate a first cyber-attack against the host computing system during the training exercise, and configuring, by the attack computing system, a second software agent to emulate a second cyber-attack against the host computing system during the training exercise, the second cyber-attack being different from the first cyber-attack. In these examples, deploying the one or more software agents includes deploying, by the attack computing system, the first software agent for execution on the host computing system to emulate the first cyber-attack against the host computing system using the one or more operational networks, and deploying, by the attack computing system, the second software agent for execution on the host computing system to emulate the second cyber-attack against the host computing system using the one or more operational networks.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise random-access memory (RAM), read-only memory (ROM), electrically programmable memory (EPROM), electrically erasable and programmable memory (EEPROM), compact-disc ROM (CD-ROM), or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSP's), general purpose microprocessors, application specific integrated circuits (ASIC's), field programmable logic arrays (FPGA's), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of IC's (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
storing, by an attack computing system, a scenario event list that defines one or more events associated with a training exercise;
configuring, by the attack computing system and based on the one or more events defined in the scenario event list, one or more software agents to emulate one or more cyber-attacks against a host computing system during the training exercise, wherein the attack computing system is communicatively coupled to the host computing system via one or more operational networks, and wherein configuring the one or more software agents further comprises:
  configuring, by the attack computing system, the one or more software agents to save a state of one or more resources of the host computing system prior to emulating the one or more cyber-attacks against the host computing system;
  configuring, by the attack computing system, at least one software agent of the one or more software agents to self-terminate its respective execution either (i) after a respective amount of time, or (ii) responsive to determining that the at least one software agent is unable to establish or maintain communication with the attack computing system via the one or more operational networks; and
  configuring, by the attack computing system, the one or more software agents to restore the state of the one or more resources of the host computing system prior to termination of the one or more software agents; and
deploying, by the attack computing system, the one or more software agents for execution on the host computing system during the training exercise to emulate the one or more cyber-attacks against the host computing system using the one or more operational networks.

2. The method of claim 1, wherein deploying the one or more software agents for execution on the host computing system during the training exercise comprises:
transmitting, by the attack computing system, the one or more software agents to the host computing system; and
after transmitting the one or more software agents to the host computing system, initiating, by the attack computing system, execution of the one or more software agents on the host computing system during the training exercise.

3. The method of claim 1,
wherein configuring the one or more software agents to save the state of the one or more resources of the host computing system comprises configuring, by the attack computing system, the one or more software agents to back up one or more of (a) at least one file or (b) at least one portion of a database of the host computing system prior to emulating the one or more cyber-attacks, and
wherein configuring the one or more software agents to restore the state of the one or more resources of the host computing system comprises restoring, by the attack computing system, the one or more of (a) the at least one file or (b) the at least one portion of the database of the host computing system upon conclusion of the one or more cyber-attacks.

4. The method of claim 1,
wherein configuring the one or more software agents to restore the state of the one or more resources of the host computing system comprises configuring, by the attack computing system, the one or more software agents to restore the state of the one or more resources of the host computing system at least by one or more of (a) restoring one or more network connections between the host computing system and one or more external devices are terminated during the one or more cyber-attacks, or (b) restarting one or more applications or services that are terminated during the one or more cyber-attacks.

5. The method of claim 1,
wherein the scenario event list further defines one or more respective times at which the one or more events occur during the training exercise occur, and
wherein deploying the one or more software agents for execution of the host computing system during the training exercise comprises determining, by the attack computing system, one or more respective times for initiating the one or more cyber-attacks by the one or more software agents based on the one or more respective times at which the one or more events occur during the training exercise.

6. The method of claim 1, further comprising:
executing, by the attack computing system, one or more attack services that are configured to provide one or more attack resources that are used by the one or more software agents during the one or more cyber-attacks; and
upon conclusion of the training exercise, deleting, by the attack computing system, data collected by the one or more attack services during the training exercise.

7. The method of claim 6, wherein the one or more attack services comprise one or more of a web server or an email server.

8. The method of claim 1, further comprising:
storing, by the attack computing system, a threat database that includes information associated with one or more of (a) the one or more cyber-attacks, (b) configuration of the one or more software agents that are used to emulate the one or more cyber-attacks, (c) the one or more events defined in the scenario event list, (d) a duration of the training exercise, (e) the one or more resources of the host computing system that are affected by the one or more cyber-attacks, and (f) save and restore operations associated with the one or more cyber-attacks that are used by the one or more software agents to save and restore the state of the one or more resources of the host computing system.

9. The method of claim 1, wherein the one or more software agents comprise a single software agent that is deployed for execution on the host computing system during the training exercise.

10. The method of claim 1, further comprising:
after deploying the one or more software agents for execution on the host computing system, receiving, by the attack computing system and from the host computing system via the operational network, status information associated with execution of the one or more software agents.

11. The method of claim 1, further comprising:
upon conclusion of the training exercise, terminating, by the attack computing system, execution of the one or more software agents on the host computing system.

12. The method of claim 1, wherein the host computing system comprises a virtualized computing system that includes one or more virtual machines.

13. The method of claim 1,
wherein configuring the one or more software agents comprises:
configuring, by the attack computing system, a first software agent to emulate a first cyber-attack against the host computing system during the training exercise; and
configuring, by the attack computing system, a second software agent to emulate a second cyber-attack against the host computing system during the training exercise, the second cyber-attack being different from the first cyber-attack, and
wherein deploying the one or more software agents comprises:
deploying, by the attack computing system, the first software agent for execution on the host computing system to emulate the first cyber-attack against the host computing system using the one or more operational networks; and
deploying, by the attack computing system, the second software agent for execution on the host computing system to emulate the second cyber-attack against the host computing system using the one or more operational networks.

14. A computing system, comprising:
one or more processors; and
a non-transitory computer-readable storage medium storing instructions that, when executed, cause the one or more processors to:
store a scenario event list that defines one or more events associated with a training exercise;
configure, based on the one or more events defined in the scenario event list, one or more software agents to emulate one or more cyber-attacks against a host computing system during the training exercise, wherein the computing system is communicatively coupled to the host computing system via one or more operational networks, wherein the one or more software agents are configured to save a state of one or more resources of the host computing system prior to emulating the one or more cyber-attacks against the host computing system, wherein at least one software agent of the one or more software agents is configured to self-terminate its respective execution either (i) after a respective amount of time, or (ii) responsive to determining that the at least one software agent is unable to establish or maintain communication with the computing system via the one or more operational networks, and wherein the one or more software agents are further configured to restore the state of the one or more resources of the host computing system prior to termination of the one or more software agents; and
deploy the one or more software agents for execution on the host computing system during the training exercise to emulate the one or more cyber-attacks against the host computing system using the one or more operational networks.

15. The computing system of claim 14, wherein the instructions stored on the non-transitory computer-readable storage medium that cause the one or more processors to deploy the one or more software agents for execution on the host computing system during the training exercise cause the one or more processors to:
transmit the one or more software agents to the host computing system; and
after transmitting the one or more software agents to the host computing system, initiate execution of the one or more software agents on the host computing system during the training exercise.

16. The computing system of claim 14,
wherein the instructions stored on the non-transitory computer-readable storage medium that cause the one or more processors to configure the one or more software agents to save the state of the one or more resources of the host computing system cause the one or more processors to configure the one or more software agents to back up one or more of (a) at least one file or (b) at least one portion of a database of the host computing system prior to emulating the one or more cyber-attacks, and
wherein the instructions stored on the non-transitory computer-readable storage medium that cause the one or more processors to configure the one or more software agents to restore the state of the one or more resources of the host computing system cause the one or more processors to restore the one or more of (a) the at least one file or (b) the at least one portion of the database of the host computing system upon conclusion of the one or more cyber-attacks.

17. The computing system of claim 14,
wherein the instructions stored on the non-transitory computer-readable storage medium that cause the one or more processors to configure the one or more software agents to restore the state of the one or more resources of the host computing system cause the one or more processors to configure the one or more software agents to restore the state of the one or more resources of the host computing system at least by one or more of (a) restoring one or more network connections between the host computing system and one or more external devices are terminated during the one or more cyber-attacks, or (b) restarting one or more applications or services that are terminated during the one or more cyber-attacks.

18. The computing system of claim 14, wherein the instructions stored on the non-transitory computer-readable storage medium further cause the one or more processors to:
execute one or more attack services that are configured to provide one or more attack resources that are used by the one or more software agents during the one or more cyber-attacks; and
upon conclusion of the training exercise, delete data collected by the one or more attack services during the training exercise.

19. The computing system of claim 14,
wherein the instructions stored on the non-transitory computer-readable storage medium that cause the one or more processors to configure the one or more software agents cause the one or more processors to:
configure a first software agent to emulate a first cyber-attack against the host computing system during the training exercise; and
configure a second software agent to emulate a second cyber-attack against the host computing system during the training exercise, the second cyber-attack being different from the first cyber-attack, and
wherein deploying the one or more software agents comprises:
deploy the first software agent for execution on the host computing system to emulate the first cyber-attack against the host computing system using the one or more operational networks; and
deploy the second software agent for execution on the host computing system to emulate the second cyber-attack against the host computing system using the one or more operational networks.

20. A non-transitory computer-readable storage medium storing instructions that, when executed, cause an attack computing system to perform operations comprising:
storing a scenario event list that defines one or more events associated with a training exercise;
configuring, based on the one or more events defined in the scenario event list, one or more software agents to emulate one or more cyber-attacks against a host computing system during the training exercise, wherein the attack computing system is communicatively coupled to the host computing system via one or more operational networks, and wherein configuring the one or more software agents further comprises:
configuring the one or more software agents to save a state of one or more resources of the host computing system prior to emulating the one or more cyber-attacks against the host computing system;
configuring at least one software agent of the one or more software agents to self-terminate its respective execution either (i) after a respective amount of time, or (ii) responsive to determining that the at least one software agent is unable to establish or maintain communication with the attack computing system via the one or more operational networks; and
configuring the one or more software agents to restore the state of the one or more resources of the host computing system prior to termination of the one or more software agents; and
deploying the one or more software agents for execution on the host computing system during the training exercise to emulate the one or more cyber-attacks against the host computing system using the one or more operational networks.

21. The non-transitory computer-readable storage medium of claim 20, wherein deploying the one or more software agents for execution on the host computing system during the training exercise comprises:
transmitting the one or more software agents to the host computing system; and
after transmitting the one or more software agents to the host computing system, initiating execution of the one or more software agents on the host computing system during the training exercise.

22. The non-transitory computer-readable storage medium of claim 20,
wherein configuring the one or more software agents to save the state of the one or more resources of the host computing system comprises configuring the one or more software agents to back up one or more of (a) at least one file or (b) at least one portion of a database of the host computing system prior to emulating the one or more cyber-attacks, and
wherein configuring the one or more software agents to restore the state of the one or more resources of the host computing system comprises restoring the one or more of (a) the at least one file or (b) the at least one portion of the database of the host computing system upon conclusion of the one or more cyber-attacks.

23. The non-transitory computer-readable storage medium of claim 20,
wherein configuring the one or more software agents to restore the state of the one or more resources of the host computing system comprises configuring the one or more software agents to restore the state of the one or more resources of the host computing system at least by one or more of (a) restoring one or more network connections between the host computing system and one or more external devices are terminated during the one or more cyber-attacks, or (b) restarting one or more applications or services that are terminated during the one or more cyber-attacks.

24. The non-transitory computer-readable storage medium of claim 20, further comprising:

Executing one or more attack services that are configured to provide one or more attack resources that are used by the one or more software agents during the one or more cyber-attacks; and upon conclusion of the training exercise, deleting data collected by the one or more attack services during the training exercise.

\* \* \* \* \*